United States Patent [19]

Koehn et al.

[11] Patent Number: 5,465,564
[45] Date of Patent: Nov. 14, 1995

[54] CONVERTIBLE MOWER DECK

[75] Inventors: Leroy F. Koehn, Moundridge; Merlin L. Esau, Newton, both of Kans.

[73] Assignee: Moridge Manufacturing, Inc., Moundridge, Kans.

[21] Appl. No.: 353,909

[22] Filed: Dec. 12, 1994

[51] Int. Cl.$^6$ .......................... A01D 34/66; A01D 34/68; A01D 34/73; A01D 75/00
[52] U.S. Cl. .......................... 56/320.2; 56/13.6; 56/17.5; 56/16.9
[58] Field of Search ................................ 56/2, 13.5, 13.6, 56/17.4, 17.5, 320.1, 320.2, 255, 16.9, DIG. 9

[56] References Cited

U.S. PATENT DOCUMENTS

| | | | |
|---|---|---|---|
| 2,836,024 | 5/1958 | Davis et al. | 56/320.2 |
| 3,680,295 | 8/1972 | Rutherford | 56/320.2 |
| 3,797,212 | 3/1974 | Pursel | 56/255 |
| 4,189,903 | 2/1980 | Jackson et al. | 56/255 |
| 5,129,217 | 7/1992 | Loehr | 56/13.6 |
| 5,210,998 | 5/1993 | Hojo et al. | 56/255 |
| 5,267,429 | 12/1993 | Kettler et al. | 56/320.2 X |

FOREIGN PATENT DOCUMENTS 2100988 7/1972 Germany.

OTHER PUBLICATIONS

The Dixon mower deck depicted in Exhibits A and B which was in public use or on sale in the United States prior to Dec. 12, 1993.
The Exmark mower deck depicted in Exhibit C which was in public use or on sale in the United States prior to Dec. 12, 1993.
The Encore mower deck depicted in Exhibit D. which was in public use or on sale in the United States prior to Dec. 12, 1993.
The John Deere mower deck depicted in Exhibit E which was in public use or on sale in the United States prior to Dec. 12, 1993.
The Woods Equipment Company mower deck depicted in Exhibit F which was in public use or on sale in the United States prior to Dec. 12, 1993.

Primary Examiner—Stephen J. Novosad
Attorney, Agent, or Firm—Shook, Hardy & Bacon

[57] ABSTRACT

A mower deck is convertible between a discharge configuration wherein grass clippings are discharged from the deck and a mulching configuration wherein grass clippings are mulched within the deck. The deck has a housing with a discharge port for discharging grass clippings from the housing when the deck is in the discharge configuration. Spindles are rotatably mounted to the housing and coupled to a drive mechanism. A cutting blade is attached to each spindle. A removable shroud can be attached to and removed from the housing. The mulching configuration of the deck corresponds to when the removable shroud is attached to the housing and the discharge configuration of the deck corresponds to when the removable shroud is detached from the housing. A fixed shroud is attached to the housing and partially enshrouds the cutting path of the cutting blade. When the removable shroud is attached to the housing, the cutting path of the blade is substantially enshrouded by a combination of the fixed shroud and the removable shroud. Tapered baffles are attached to the removable shroud and are positioned substantially perpendicular to the cutting paths of the blades so that the baffle facilitates zones of turbulence in the airstream above and around the blade, the zones of turbulence causing grass clippings to drop to the ground.

16 Claims, 2 Drawing Sheets

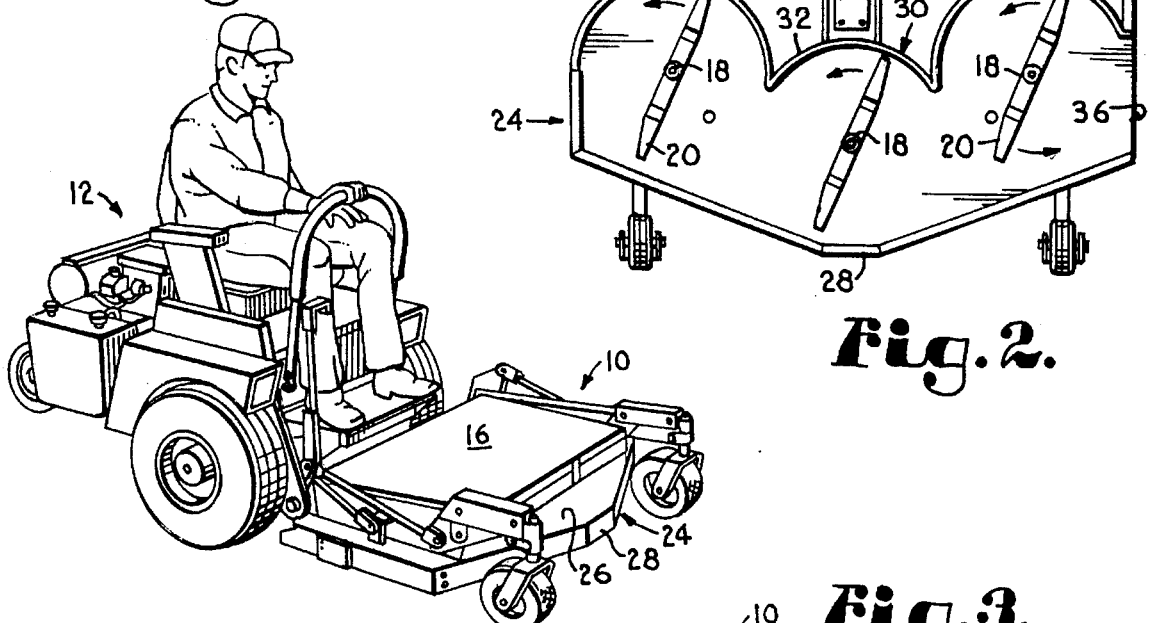
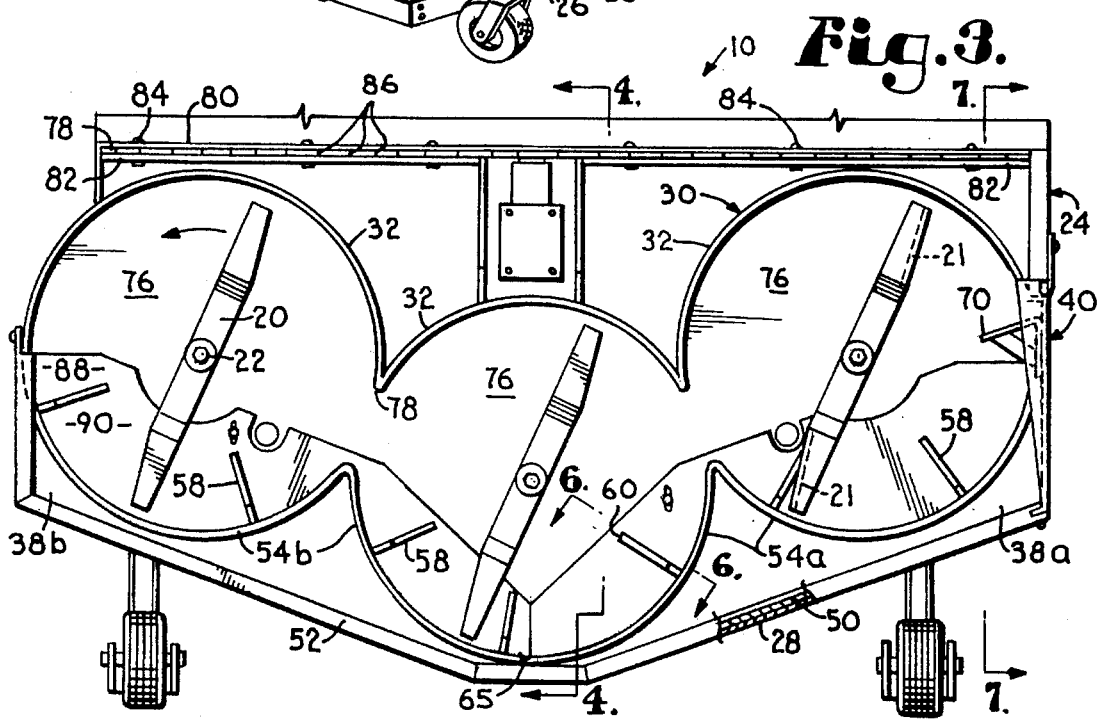
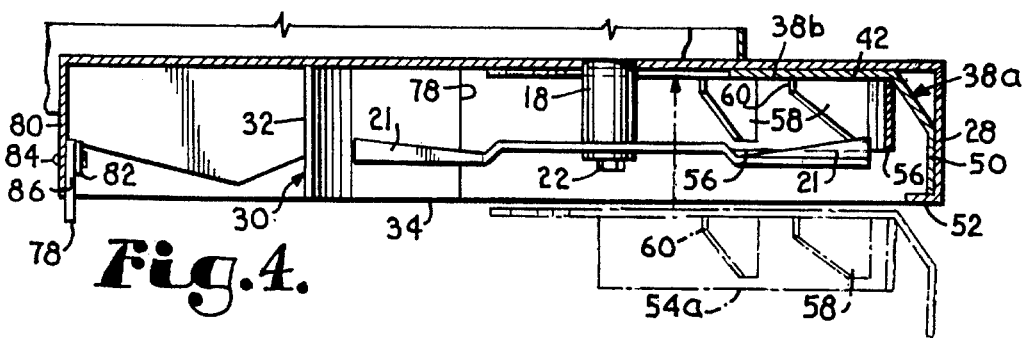

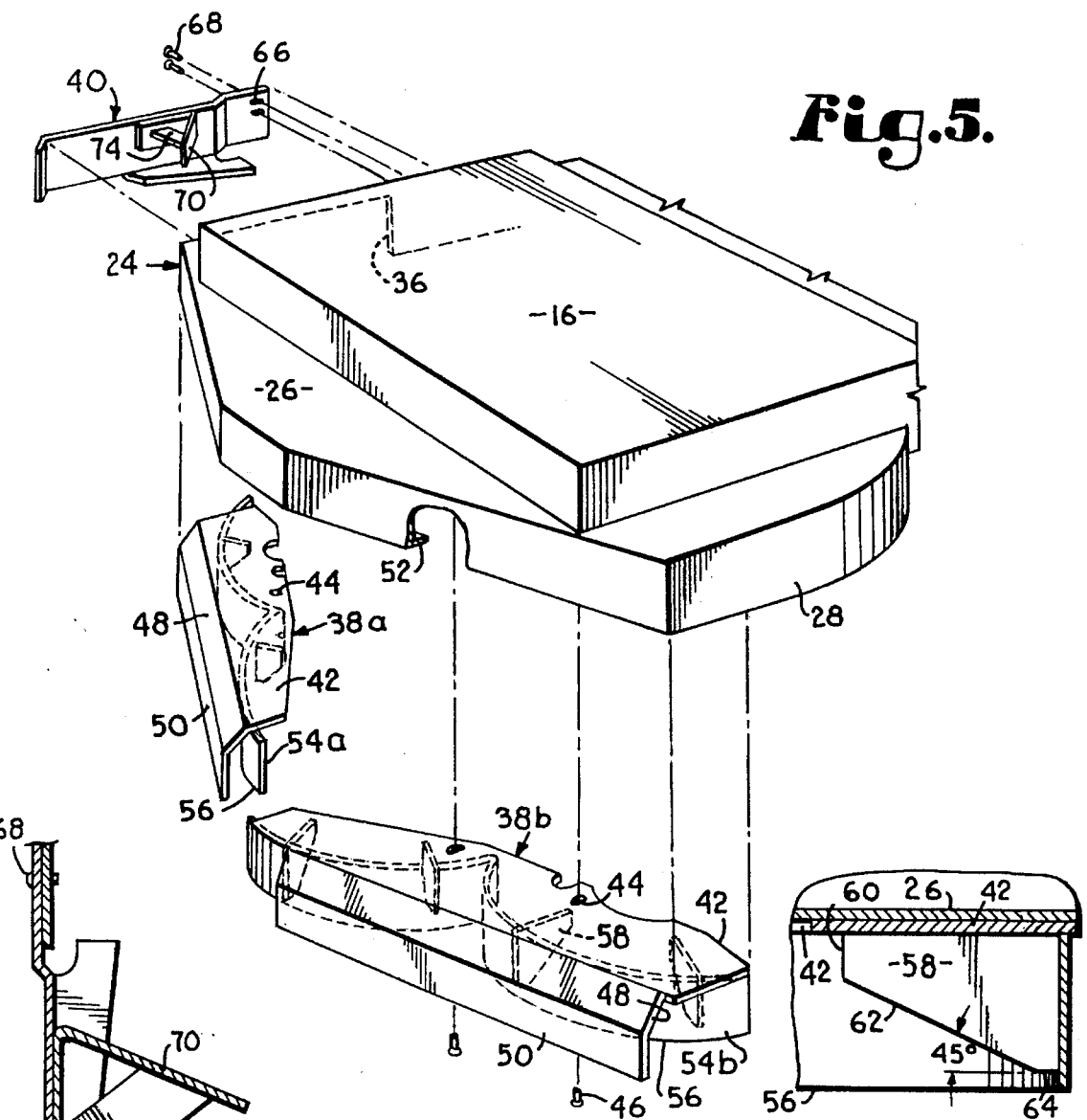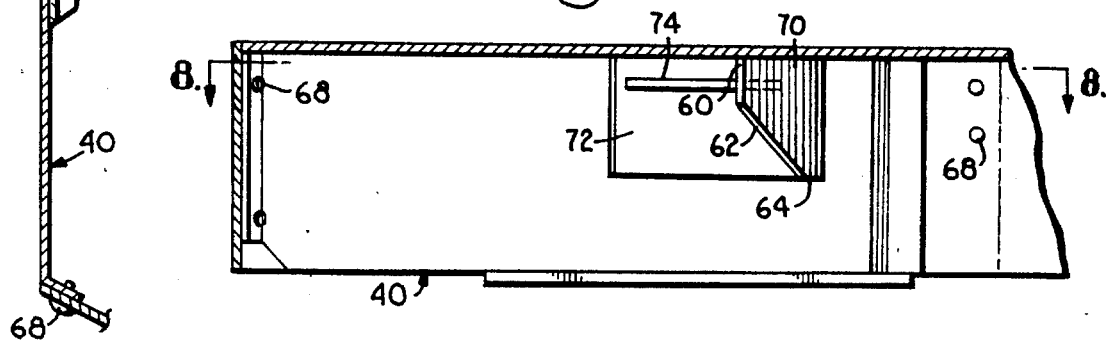

CONVERTIBLE MOWER DECK

This invention relates to a mower deck which is convertible between a discharge configuration wherein grass clippings are discharged sidewardly from the deck and a mulching configuration wherein grass clippings are deposited downwardly onto the surface cut by the deck.

A popular type of highly maneuverable mower includes a tractor fitted with a mowing deck. These mowing decks typically have a plurality of cutting blades rotatably mounted to a deck housing. The rotating blades cut the growing grass in a swath as the tractor and attached deck move across the ground. The deck with the cutting blades attached is vertically adjustable to obtain the desired cutting depth. The cutting blades are normally coupled together via a driving arrangement of spindles and belts or chains. Power is supplied to the driving arrangement by the tractor via a power takeoff or some other drive belt or drive chain arrangement.

Under certain conditions it may be desirable that the grass clippings be discharged from beneath the deck during the cutting operation. They may be simply discharged out over the turf, or they may be collected in a bag or container for disposal elsewhere.

Under other conditions it may be desired that the clippings be comminuted into a mulch and dropped onto the cut turf for gravitation to the ground and eventual decomposition as an enrichment for the soil. In mulching operations, the grass clippings are usually or desirably re-cut by the blades into shorter lengths after the clippings are first severed from the growing grass. The shorter lengths contribute to the sifting of the clippings downwardly through the turf. They also seem to speed the decomposition process.

It has long been known that vanes projecting inwardly from the housing of a mower in disposition to be engaged by the grass clippings enhanced the comminution of the clippings to provide a mulch. U.S. Pat. No. 2,836,024 to Davis teaches this concept. It has long been common practice for mower manufacturers to provide shrouds around each blade of a multi-bladed mower to confine the clippings severed from a blade within the shroud until the clippings could be deflected or otherwise dropped from the airstream above the blade and into the path of the blade to be cut thereby. An example of a mower of this type is the mower manufactured and sold by Hesston Manufacturing Company, Hesston, Kans., under the trade name FRONTRUNNER.

Heretofore, mulching mowers have generally been configured specifically to carry out the mulching operation. Attempts have been made to provide attachments or inserts for conventional side discharge or bagger mowers to adapt them for mulching operations. These have not generally been very well accepted for a variety of reasons. As a result, a user desiring a mulching mower has found it necessary to purchase a permanently configured or "dedicated" mower for this purpose.

Thus, in the past, an operator of tractor and deck-type mowers was required to switch between a discharge/collection deck and a mulching deck depending upon which operation was desired. This required the operator to purchase two completely different decks for performing the different mowing operations. Thus, many mower operators were forced to choose between the discharge/collection operation and the mulching operation because it was cost-prohibitive to purchase the two different types of decks.

Further, permanently configured mulching decks of the prior art have not heretofore provided a construction free from the problem of clumps of clippings dropping downwardly onto the cut surface of a lawn.

Thus, a mower deck is needed which allows versatility and ease in switching between a discharge/collection operation and a mulching operation. The mower deck should be constructed so that it can be easily and quickly converted from a discharge-type deck to a mulching-type deck, thus dispensing with the need and expense of having two entirely different mower decks. Further, the mulching configuration of the deck should have simple and efficient structures for avoiding clump-causing buildup on the mower and for efficiently depositing grass clippings downwardly onto the cut surface of the lawn.

Accordingly, it is a primary object of the present invention to provide a mower deck which is constructed so that it can be easily switched from a discharge configuration wherein grass clippings are discharged from the deck and a mulching configuration wherein grass clippings are deposited downwardly onto the cut surface.

Still another object of this invention is to provide a removable shroud which can be attached and detached from a mower deck to provide the mulching configuration of the deck when the shroud is attached to the deck and the discharge configuration of the deck when the shroud is detached from the deck.

Another object of this invention is to provide a mower deck having a fixed shroud which partially enshrouds the cutting path of a cutting blade and wherein, when the removable shroud is attached to the deck, the cutting path is substantially enshrouded by a combination of the fixed shroud and the removable shroud.

A further object of this invention is to provide a removable shroud for a mower deck which has a baffle attached thereto, the baffle being positioned substantially perpendicular to the cutting path of the cutting blade so that the baffle provides zones of turbulence in the airstream above and around the blade to cause grass clippings to drop from the airstream to be re-cut by the blade before gravitating to the ground.

These and other important aims and objects of the present invention will be further described, or will become apparent from the following description and explanation of the drawings, wherein:

FIG. 1 is a top perspective view of a mower deck embodying the principles of this invention attached to a tractor and showing the deck in a mulching configuration;

FIG. 2 is a bottom plan view of the mower deck of the present invention configured for the side discharge of grass clippings;

FIG. 3 is an enlarged bottom plan view of the mower deck of FIG. 2 with removable shroud sections and a discharge port covering plate in place so that the deck is in its mulching configuration;

FIG. 4 is a detailed cross-sectional view taken generally along line 4—4 of FIG. 3, one of the removable shroud sections being shown in phantom lines prior to its installation in the deck;

FIG. 5 is an exploded top perspective view of the mower deck of FIG. 1 showing the installation positions of the removable shroud sections and the discharge port covering plate, hidden portions of the shroud sections, including the baffles, shown in broken lines and parts being broken away to reveal details of construction;

FIG. 6 is a fragmentary, enlarged detailed cross-sectional view taken generally along line 6—6 of FIG. 3;

FIG. 7 is a fragmentary, enlarged detailed cross-sectional view taken generally along line 7—7 of FIG. 3, and showing the discharge port covering plate;

FIG. 8 is a fragmentary, detailed cross-sectional view taken generally along line 8—8 of FIG. 7.

A mower deck embodying the principles of this invention is broadly designated in the drawings by the reference numeral 10. Deck 10 is connected to tractor 12. Tractor 12 is used to propel deck 10 over the surface to be cut as best shown in FIG. 1. A power takeoff shaft (not shown) of tractor 12 is drivingly coupled to gear box 14 which in turn is connected to a drive arrangement (not shown) contained in drive compartment 16 located on the upper surface of the deck. The drive arrangement normally consists of a system of belts and pulleys which transfers the power from the power takeoff shaft to spindles 18. As best shown in FIGS. 3 and 4, spindles 18 in turn are connected to cutting blades 20 by attaching bolts 22. Thus, power from the power takeoff shaft of tractor 12 is transferred to cutting blades 20 via gear box 14 and the drive arrangement so that blades 20 are rotated to perform the cutting action of deck 10.

Deck 10 has a housing 24 which is used to rotatably support spindles 18 and contains blades 20 as best shown in FIGS. 2–4. Housing 24 has an upper horizontal plate 26 with sidewall 28 extending downwardly from its periphery. Drive compartment 16 is positioned on the upper surface of plate 26.

With reference to FIG. 2, a fixed shroud or wall 30 extends perpendicularly to and downwardly from plate 26. Shroud 30 consists of three arcuate sections 32 which together give shroud 30 an undulating configuration. Each section 32 is disposed slightly outboard from and conforms to an arcuate portion of the planar, circular cutting path of one of blades 20. Lower edge 34 of shroud 30 terminates at a location that is below the cutting plane of blades 20 as best shown in FIG. 4. Further, edge 34 is substantially coplanar with the lower edge of sidewall 28. The conformation of arcuate sections 32 to a portion of the cutting paths of blades 20 provides a partial enshrouding of blades 20.

With reference to FIG. 2, deck 10 is shown in its side discharge operating configuration. In this configuration, as blades 20 are rotated in a counterclockwise direction in FIG. 2 as indicated by the arrows, grass coming in contact with the blades is cut and propelled above the blades. Further, upwardly extending vanes 21 of each blade 20 (as shown in FIG. 4) create a high velocity rotational stream of air above the blade as the blade is rotated. Grass clippings are caught in this stream of air and propelled therewith. Shroud 30 prevents the rearward movement of these grass clippings. With reference to FIG. 2, grass clippings located in the rotational airstream above the blade 20 located on the left are propelled in a counterclockwise rotation, and are eventually transferred to the rotational airstream above the middle blade 20. As a result of the counterclockwise rotation of the middle blade 20, the grass clippings are again transferred to the airstream above the blade 20 located on the right in FIG. 2. The airstream above the right blade 20 exits through discharge port 36 formed in housing 24. As the airstream exits from housing 24 through port 36, so do the grass clippings contained therein. Thus, grass clippings cut by blades 20 are propelled from left to right in FIG. 2. The clippings are propelled in circulating airstreams above the blades and eventually propelled out of housing 24 through port 36. The provision of shroud 30 around the back portions of the cutting paths of the cutting blades with the front portions of the cutting paths of the cutting blades being open allows grass clippings to be easily transferred from one airstream to another airstream, and thus, eventually expelled from housing 24 through port 36. Port 36 can be connected to a tube or chute which can further be connected to a grass bag or container for collecting the grass clippings expelled through the port.

With reference to FIGS. 3–5, deck 10 is shown in its mulching configuration. In this configuration, a pair of removable shroud sections 38a and 38b and discharge port covering plate 40 are attached to housing 24. Shroud sections 38a and 38b each has an upper horizontal attaching plate 42 which has attaching apertures 44 therein. Apertures 44 align with corresponding threaded apertures (not shown) in plate 26 of housing 24 so that bolts 46 can be positioned through apertures 44 and threaded into the apertures in plate 26 to secure shroud sections 38a and 38b in position. Each plate 42 is juxtaposed and parallel to plate 26 when sections 38a and 38b are in their attached position in housing 24, as best shown in FIG. 4.

Shroud sections 38a and 38b further each has a positioning flange 48 extending outwardly and downwardly from the forward edge of plate 42, as best shown in FIGS. 4 and 5. When shroud sections 38a and 38b are attached to housing 24, vertical portions 50 of flanges 48 abut and are parallel to sidewall 28 of housing 24. Further, the bottom edges of portions 50 rest upon ledge 52 of sidewall 28 so that flanges 48 serve to further secure and position shroud sections 38a and 38b within housing 24.

Shroud section 38a has arcuate sections or walls 54a extending perpendicular to and downwardly from plate 42. Each section 54a has an arcuate configuration that is disposed slightly outboard from and conforms to the cutting path of a respective blade 20, as best shown in FIG. 3. Sections 54a give shroud section 38a an undulating configuration which conforms partially to the cutting paths of some of blades 20. The section 54a located adjacent the center blade 20 conforms partially to and is slightly outboard from the cutting path thereof and the section 54a located on the right in FIG. 3 conforms to and is slightly outboard from the cutting path of the right blade 20. Further, the rightmost portion of the right section 54a terminates adjacent to and may abut covering plate 40. Shroud section 38a is positioned generally in the forward portion of housing 24. A lower edge 56 of sections 54a terminates at a location that is above the cutting path of blades 20, as best shown in FIG. 4.

Shroud section 38a further has baffles 58 which are connected to and extend downwardly from plate 42 and are connected to and extend inwardly from sections 54a. The section 54a located adjacent the center blade 20 has one baffle 58 attached thereto. The section 54a located adjacent the right blade 20 has two baffles 58 placed therealong. Baffles 58 are radially aligned with their respective spindles 18 and are generally perpendicular to the planar cutting path of their respective cutting blades 20. Baffles 58 have inner vertical edges 60 which terminate at a location radially outward from the vertical axis of their respective spindles 18. Baffles 58 further have slanted edges 62 which extend downwardly and outwardly to baffle bottom edges 64 as best shown in FIG. 6.

Shroud section 38b has arcuate sections or walls 54b extending perpendicular to and downwardly from plate 42. Each section 54b has an arcuate configuration that is disposed slightly outboard from and conforms to the cutting path of a respective blade 20, as best seen in FIG. 3. Sections 54b give shroud section 38b an undulating configuration which conforms partially to the cutting paths of some of blades 20. The section 54b located adjacent the center blade 20 conforms partially to and is slightly outboard from the cutting path thereof, and the section 54b located on the left in FIG. 3 conforms to and is slightly outboard from the cutting path of the left blade 20. Further, the leftmost portion of the left section 54b terminates adjacent to and may abut the left portion of sidewall 28. Shroud section 38b is also positioned generally in the forward portion of housing 24. Sections 54b also have a lower edge 56 that terminates at a location that is above the cutting path of blades 20, as shown in FIG. 4.

Shroud section 38b also has baffles 58 which are connected to and extend downwardly from plate 42 and are connected to and extend inwardly from sections 54b. The section 54b located adjacent the center blade 20 has two baffles 58 attached thereto and spaced therealong. The section 54b located adjacent the left blade 20 also has two baffles 58 spaced therealong. The baffles 58 attached to section 38b are identical to the baffles 58 attached to section 38a described above.

With reference to FIG. 3, the innermost portion of the middle section 54a overlaps upon the innermost portion of the middle section 54b at location 65 so that arcuate sections 54a and 54b of shroud sections 38a and 38b form essentially one forward shrouding wall when sections 38a and 38b are positioned in housing 24.

Covering plate 40 is positioned and secured over port 36 by bolts 68 which are received through attaching apertures 66 in plate 40 and into tapped apertures within sidewall 28 of housing 24, as best shown in FIGS. 5, 7, and 8. Thus, plate 40 completely seals off discharge port 36 so that the normal discharging airstream is maintained within the housing. Plate 40 further has baffle 70 extending from its interior surface and held in place by attaching portion 72 and brace 74. Like baffles 58, baffle 70 is radially aligned with the vertical axis of the respective adjacent spindle 18, is perpendicular to the cutting path of the respective blade 20, and has an inner vertical edge 60 which terminates at a location radially removed from its respective spindle 18. Further, baffle 70 has a slanted edge 62 extending from inner edge 60 downwardly and outwardly to bottom edge 64.

With reference to FIG. 3, when shroud sections 38a and 38b are positioned in housing 24, the combination of shroud 30 and shroud sections 38a and 38b forms enclosures 76 about each of blades 20. Enclosures 76 substantially enshroud the entire cutting path of their respective blades 20. Enclosures 76 are in spatial communication via openings 78 between the enclosures.

Housing 24 also has downwardly extending, somewhat flexible flap 78 attached to the rearward portion 80 of sidewall 28 as shown in FIGS. 3 and 4. Although flap 78 is attached to housing 24 in both the discharge and mulching configurations, it has not been shown in FIG. 2 since this view is intended primarily to show the discharge configuration of the deck. Flap 78 is attached to portion 80 by attaching plates 82 and bolts 84 which extend through and fasten together plates 82, flap 78, and portion 80. Flap 78 has a plurality of mutually parallel slits 86 spaced along its bottom edge of the flap so that the segments of the flap formed by the slits can move independently of one another. Flap 78 extends below the lower edge of portion 80 of sidewall 28 as best shown in FIG. 4. Slits 86 extend upwardly from the bottom edge of flap 78 and terminate at a location above the lower edge of portion 80. Flap 78 serves to sift or brush grass clippings lying on the top of the cut surface downwardly into the turf so that they will gravitate to the ground to be decomposed more easily. Flap 78 can be made of any type of relatively flexible material, such as rubber, neoprene, or the like. It has been found desirable to have the lower edge of the flap extend approximately one half inch to one inch below the lower edge of portion 80. Further, it has been found to be advantageous to make flap 78 approximately ⅜ inch thick and make slits 86 approximately two inches in length.

During the mulching operation of deck 10, grass clippings cut by blades 20 are carried in high velocity rotational airstreams resulting from the rotation of the blades as described. These airstreams occur generally above and around each of the blades. Because of the positioning of shroud sections 38a and 38b and shroud 30 to form enclosures 76 which substantially enshroud the cutting paths of the blades, a substantial portion of the grass clippings are not allowed to migrate from the airstreams above one blade to the airstream above another. Grass clippings in an airstream above one of the blades are preferably deposited downwardly onto the cut surface below the blade after being comminuted into relatively short lengths by repeated contact by the blade. Baffles 58 enhance the downward movement of the grass clippings in the airstream above a particular blade by providing zones of turbulence within the airstream, these zones permitting the grass clippings within the airstream to drop out to be further comminuted by the blade and deposited on the cut surface. Thus, as blades 20 with integral vanes are rotated counterclockwise in FIG. 3 and high velocity airstreams result in the same direction above and around the blades, the high velocity airstreams encounter the sides of the baffles. The contact of the high velocity airstreams on the sides of the baffles creates high pressure areas on the contacted sides of the baffles. With reference to FIG. 3, an example of a high pressure area is indicated by the reference numeral 88. On the side of the baffle opposite to where the airstream contacts the baffle, a low pressure area 90 is created. It is this pressure differential on opposite sides of each baffle which creates the turbulences in the airstream which contribute to the downward movement of grass clippings within the airstream. Baffle 70 on plate 40 serves the same purpose as baffles 58. Further, it has been found that the zones of turbulence created by the baffles help prevent buildup of grass clippings along the periphery of the cutting path of the blades and adjacent the shroud walls.

During the mulching operation, the inwardly slanted edges 62 of baffles 58 and 70 tend to cause the grass clippings in the airstreams to migrate toward the centers of the blades. This has been found to be advantageous in that it keeps clippings from overloading the airstream adjacent the outer periphery of the blade. Under commonly encountered conditions, it has been found desirable to have edges 62 of baffles 58 and 70 slanted at approximately a 45 degree angle from the horizontal as shown in FIG. 6. Further, it is found to be advantageous to locate the baffles 58 along the front portion of housing 24. This construction in conjunction with the rotation of the blades and the movement of the airstreams enhances the effectiveness with which the grass clippings are adequately comminuted and are deposited on the cut turf.

As described, lower edges 56 of shroud sections 38a and 38b are positioned above the cutting paths of blades 20, and lower edge 34 of fixed shroud 30 is positioned below the cutting paths of the blades. This configuration allows air to escape forwardly from the enclosures 76 to further enhance downward depositing of grass clippings onto a cut surface during the mulching operation. Additionally, it has been found that the effectiveness of baffles 58 and 70 can be increased if their inner edges 60 are terminated in a vertical edge located a distance radially away from the vertical axis of their respective spindle. This construction increases the amount of space at the center region of the shroud to carry clippings and prevent clogging. More particularly, it has been found advantageous to have the baffles terminate a distance from the vertical axis of the spindle that is approximately one half to two-thirds of the radial length of the blades (i.e., one half to two-thirds of the distance from the center of the blade to one of its outer edges as shown in the drawings).

As described, enclosures 76 have openings 78 between them so that the enclosures are mutually interconnected. These openings allow some of the grass clippings in the airstreams to migrate from enclosures located on the left side as shown in FIG. 3, toward the enclosures located on the right side. This migration is due to the counterclockwise rotation of the blades. Because of this migration of grass clippings from the enclosures on the left toward the enclosures on the right, it has been found that fewer baffles are required in the furthermost left enclosure than in the other side of the deck. For instance, in FIG. 3, the enclosure located on the left side of the deck has two baffles, and the middle enclosure and the enclosure on the right each have three baffles.

In addition to the baffles 58, flap 78 also enhances the mulching process by sifting or brushing grass clippings downwardly into the turf after they have been deposited on it. This downward brushing enhances the decomposition of the clippings.

Switching from the side discharge configuration, shown in FIG. 2, to the mulching configuration shown in FIGS. 3–5, is easily and effectively accomplished with a minimal amount of time and effort. More particularly, the conversion simply requires the positioning and bolting of shroud sections 38a and 38b within housing 24 and the positioning and bolting covering plate 40 over discharge port 36. The engaging arrangement of positioning flanges 48 with sidewall 28 of housing 24 allows shroud sections 38a and 38b to be securely attached to the housing by bolts 46. In order to convert the deck from the mulching configuration to the side discharge configuration, bolts 46 and 68 are removed and shroud sections 38a and 38b and covering plate 40 are removed from the housing. Thus, the invention provides a simple and effective mower deck construction which may easily be converted between a discharge configuration and a mulching configuration. Further, the mulching configuration with the construction and shape of the baffles and the height differential between the fixed and removable shrouds provides for increased effectiveness in the mulching operations.

Having described the invention, what is claimed is:

1. A mower deck which is convertible between a discharge configuration wherein grass clippings are discharged from the deck and a mulching configuration wherein grass clippings are comminuted within the deck, the mower deck comprising:

a housing, said housing having a discharge port for discharging grass clippings from said housing when the deck is in its discharge configuration;

a plurality of elongated, vertically extending spindles rotatably mounted to said housing and adopted to be drivingly coupled to a drive mechanism;

a cutting blade for each spindle, said blades being attached to their corresponding spindles;

a removable shroud which can be attached to and removed from said housing, the mulching configuration of the deck corresponding to the configuration of the deck with said removable shroud attached to said housing, and the discharge configuration of the deck corresponding to the configuration thereof with said removable shroud detached from said housing;

a fixed shroud attached to said housing in disposition wherein the cutting path of said blade is substantially enshrouded by a combination of said fixed shroud and said removable shroud when said removable shroud is attached to said housing; and at least one baffle for each blade, respectively, each baffle being attached to said removable shroud, said baffles being positioned substantially perpendicular to the cutting path of its respective blade so that the baffles facilitate zones of turbulence in the airstreams created around said blades, whereby said zones of turbulence permit grass clippings to drop to the ground.

2. The mower deck of claim 1 wherein said baffles have inner edges which terminate at locations spaced radially from the vertical axis of said respective spindles.

3. The mower deck of claim 2 wherein said baffles each have a slanted edge and a bottom edge, and wherein said slanted edge slopes downwardly from said inner edge toward the bottom edge of said baffle.

4. The mower deck of claim 3 wherein said baffles are aligned radially with their respective spindles.

5. The mower deck of claim 4 wherein said inner edges of said baffles terminate at a distance away from said spindle that is approximately between one-half and two-thirds of the distance from one end of the blade to said spindle.

6. The mower deck of claim 3 wherein said fixed shroud is located generally in the rear portion of the mower deck and said removable shroud is located generally in the forward portion of the mower deck.

7. The mower deck of claim 6 wherein said fixed shroud has a lower edge which extends below said blade and said removable shroud has a lower edge which terminates at a location above said blade.

8. The mower deck of claim 2 wherein said removable shroud has an attaching plate which, when said shroud is attached to said housing, is parallel to and juxtaposed to a generally horizontal upper plate of said housing, and wherein an attaching means is used to secure said attaching plate to said upper plate to secure said removable shroud in proper position.

9. The mower deck of claim 2 further comprising a covering plate for attachment to said housing to cover said discharge port when the mower deck is in its mulching configuration.

10. The mower deck of claim 9 wherein said covering plate includes a baffle attached thereto, said baffle being positioned substantially perpendicular to the cutting path of its corresponding blade so that the baffle facilitates zones of turbulence in the airstream above and around said blade, said zones of turbulence causing grass clippings to drop from said airstream to the ground.

11. The mower deck of claim 10 wherein said baffle is supported by a brace which extends between said baffle and said covering plate.

12. The mower deck of claim 2 wherein said housing has an elongated flexible flap located along a rear edge of said housing, said flap being disposed for brushing grass clippings which are deposited on the top of the cut surface downwardly to a location that facilitates decomposition of the clippings.

13. The mower deck of claim 12 wherein said flap has a plurality of slits disposed along its length providing a plurality of individual flexible segments in the flap.

14. The mower deck of claim 2 wherein said fixed shroud has an undulating configuration so that it partially enshrouds the rear portions of the cutting paths of said plurality of cutting blades, said removable shroud having at least two sections that form an undulating configuration so that, when said sections are attached to said housing, said sections partially enshroud the front portions of the cutting paths of said plurality of cutting blades, said fixed shroud and said removable shroud sections forming a plurality of enclosures each of which substantially enshrouds the path of one of said cutting blades, each said enclosure being in spatial communication with an adjacent enclosure so that grass clippings can pass from one enclosure to the next, each said enclosure having a plurality of baffles attached to said removable shroud sections, said baffles being positioned substantially perpendicular to the cutting path of their respective blades and radially aligned to their respective spindles so that the baffles are disposed to create zones of turbulence in the airstreams above and around said blades, said zones of turbulence causing grass clippings to drop from said airstreams to the ground.

15. The mower deck of claim 14 wherein an enclosure on one side of said housing has fewer baffles than enclosures laterally disposed towards the other side of said housing, the flow of grass clippings moving from the enclosure with fewer baffles to those enclosures with a greater number of baffles.

16. A removable shroud which can be attached to and removed from a mower deck, the mower deck having a mulching configuration which corresponds to when said removable shroud is attached to the deck and a discharge configuration which corresponds to when said removable shroud is detached from the deck, the shroud comprising:

an attaching plate which, when said shroud is attached to said housing, is parallel to and juxtaposed to a generally horizontal upper plate of the mower deck;

attaching means for securing said attaching plate to the upper plate to hold the removable shroud in position;

a wall extending downwardly from said attaching plate and at least partially enshrouding the cutting path of the blade of the mower deck; and at least one baffle extending inwardly from said wall and downwardly from said attaching plate, said baffle positioned substantially perpendicular to the cutting path of said blade so that it facilitates zones of turbulence in the airstream above and around said blade, said zones of turbulence causing grass clippings to drop from said airstream to the ground, said baffle having an inner edge which terminates at a location that is removed from the center of the cutting path of the blade and a slanted edge which slopes downwardly from said inner edge toward a bottom edge of said baffle.

* * * * *